UNITED STATES PATENT OFFICE.

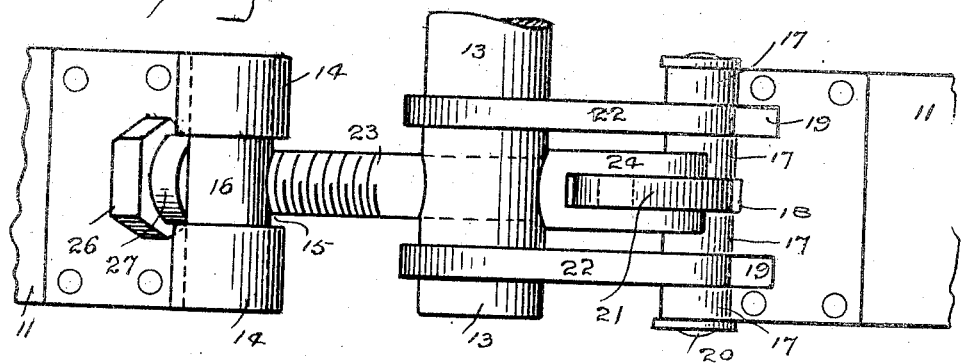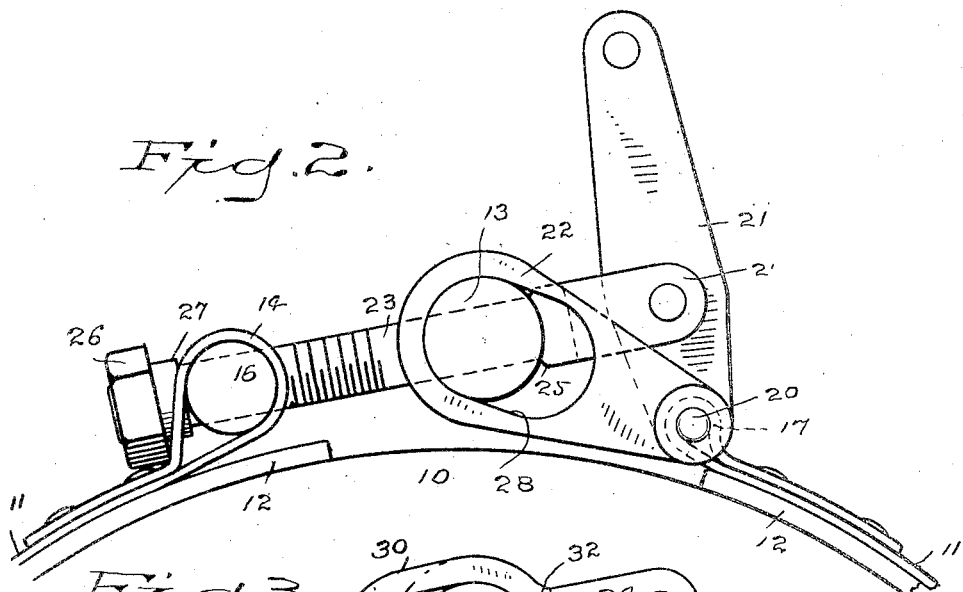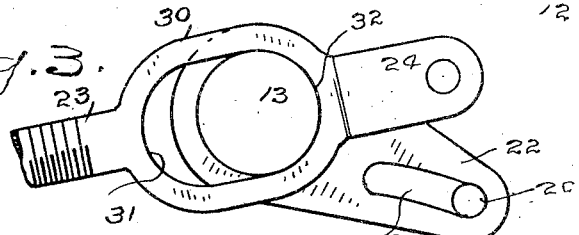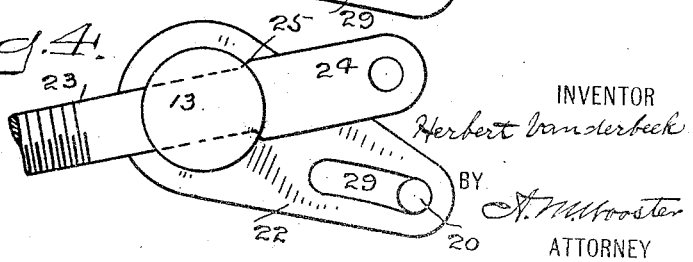

HERBERT VANDERBEEK, OF BRIDGEPORT, CONNECTICUT, ASSIGNOR, BY MESNE ASSIGNMENTS, TO THE ROYAL EQUIPMENT COMPANY, OF BRIDGEPORT, CONNECTICUT, A CORPORATION OF CONNECTICUT.

BRAKE.

958,446.  Specification of Letters Patent.  Patented May 17, 1910.

Application filed October 14, 1909. Serial No. 522,630.

*To all whom it may concern:*

Be it known that I, HERBERT VANDERBEEK, a citizen of the United States, residing at Bridgeport, county of Fairfield, State of Connecticut, have invented an Improvement in Brakes, of which the following is a specification.

This invention has for its object to provide a brake suitable for machinery or vehicles, in which the braking effect will be relatively large compared with the operating force and in which the effect will be equally efficient in both directions of rotation of the drum. To accomplish this result I take advantage of the well known "wrapping" or "winding" effect of a flexible band surrounding and in contact with a rotating drum, one end of said band being fixed while the operating force is applied to the other end in the direction of rotation of the drum; and in order to gain this effect in both directions of rotation I have provided means by which either end of the band automatically becomes the fixed end, depending upon the direction of rotation of the drum.

In the accompanying drawing forming a part of this specification, in which similar reference characters indicate the same parts in all the views, Figure 1 is a plan view illustrating the setting mechanism of my novel brake, the drum being omitted; Fig. 2 a side elevation of the brake complete; Figs. 3 and 4 are detail views illustrating modifications in the details of construction.

10 denotes the brake drum, 11 the brake band, 12 the brake pad and 13 a fixed arm or support extending from the framework (not shown). The brake pad lies in proximity to the drum and is secured to and retained in place by the band. The left end of the brake band, as shown in the drawing, is connected to a stud 16 having a transverse hole for a purpose presently to be explained. In the present instance the band is shown as curved over backward and riveted to itself to form eyes 14, there being an opening 15 between the eyes corresponding with the hole in the stud. Support 13 is also provided with a transverse hole in alinement with the hole in the stud. The right end of the brake band, as shown in the drawing, is connected to a stud 20. In the present instance the band is shown as curved over backward and riveted to itself to form eyes 17, four in number. Between the two central eyes is an opening 18 and between the two central eyes and the two end eyes are openings 19.

21 denotes an operating lever pivoted on stud 20 between the central eyes 17, and 22 denotes link plates the respective ends of which are loosely connected to support 13 and to stud 20 between the central and end eyes 17, as clearly shown in Fig. 1.

23 denotes an adjusting bolt which passes through the transverse holes in support 13 and stud 16, is provided with a yoke 24 by means of which it is pivoted to the operating lever, with a shoulder 25 or an engaging wall 32 adapted to engage the support, for a purpose presently to be explained, and the other end of which is provided with an adjusting nut 26 having on its inner face a collar 27 which lies in opening 15 and is adapted to bear against stud 16. The function of this adjusting bolt and adjusting nut is to provide a means for taking up the wear of the brake pad so as to insure close contact at all times of the brake pad with the drum.

It is of course well understood that in brakes of this character the action of the operating lever is to set the brake, and that the first effect of the operation of the lever is to cause the drum to pick up the brake pad and carry it slightly in the direction of its movement, the braking action being produced by the close wrapping of the brake pad about the drum. In order to insure equally perfect action of the brake when the drum is turning either forward or backward, it is necessary to provide for longitudinal movement of both the link plates and the adjusting screw so that the fixed point of support of the brake band will automatically shift from one end of the band to the other. When the drum is turning forward and the brake is applied, the link plates become holding members. The right ends of the link plates engage support 13 and stud 20 engages the left end of the link plates, the brake being set by pull upon the left end of the band. When the drum is turning backward and the brake is applied the adjusting screw becomes the holding member through the engagement of shoulder 25 with the support, the brake being set by pull upon the right end of the band. The necessary longitudinal movement of the link plates in braking when the drum is turning forward may be provided for by means of slots 28 through which support 13 passes as in Fig. 2, or by means of slots 29 through which stud 20 passes as in Figs. 3 and 4. In the latter form, slots 19 in the end of the brake band are elongated so as to permit movement of the link plates.

The necessary longitudinal movement of the adjusting bolt in braking when the drum is turning backward may be provided for either as in Fig. 2 or in Fig. 3. In Fig. 2 the adjusting bolt slides freely through the transverse hole in support 18 until shoulder 25 engages the support. In the form illustrated in Fig. 3 the adjusting bolt is shown as provided with a central enlargement 30 having a slot 31 through which the support passes, the right end of the slot, as seen in Fig. 3, comprising a wall which engages the support and holds the adjusting screw against further movement.

The operation is as follows: When the upper end of the operating lever as seen in Fig. 2 is moved toward the right, the first effect is to draw the ends of the brake band and brake pad toward each other and to close the brake pad about the drum. An instant later the brake pad is picked up by the drum and carried slightly in the direction of its rotation. If the drum is turning forward, that is toward the right as seen in the drawing, the pad will be carried by the drum until the left ends of the link plates engage the support, as in Fig. 2, or until studs 20 engage the right ends of slots 29, as in Figs. 3 and 4. Either of these engagements stops further movement of the brake band and brake pad and causes the pad to wrap tightly about the drum and thus secure the most perfect frictional braking action possible, the pull being entirely upon the support. Suppose now that the drum is rotating backward, that is toward the left as seen in the drawing, and that the brake is set by means of the operating lever. The first effect is to draw the ends of the brake band and brake pad toward each other as before and to close the brake pad about the drum. An instant later the brake pad is picked up by the drum as before and carried backward until shoulder 25 on the adjusting bolt engages the support, as in Fig. 2, or until wall 32 at the right end of slot 31 engages the support as in Fig. 3. Either of these engagements stops further movement of the brake band and brake pad and causes the pad to wrap tightly about the drum and thus secure the most perfect frictional braking action possible, the pull being entirely upon the support.

Having thus described my invention I claim:

1. An improved brake comprising a support, a brake band adapted to engage a rotary drum, longitudinally movable link plates pivotally connected with one end of said brake band and connecting the latter with said support, an operating lever pivotally connected with said band at the point of pivotal connection of said link plates, and an adjusting bolt having its ends directly connected with the other end of said brake band and with said lever, respectively, the shank of said bolt being provided with means for engaging said support to limit its movement.

2. As an improvement in brakes, a support, a brake band adapted to engage a rotary drum, a stud carried by one end of said band, an operating lever pivotally mounted on said stud, longitudinally movable link plates connecting said stud and said support, and an adjusting bolt directly connecting the other end of said band with said lever and movable with relation to said support, the shank of said bolt provided with means for engaging said support to limit the movement of the bolt.

3. A brake comprising a rotary drum, a brake band inclosing the drum, an operating lever connected to one end of the band, a support having a transverse hole, a longitudinally movable adjusting bolt which passes through the hole, is connected to the other end of the band and to the lever and is provided with a shoulder adapted to engage the support to limit the movement of the band when the drum is turned backward and longitudinally movable link plates between the support and the end of the band that is connected to the lever.

4. A brake comprising a band having eyes at one end with an opening between them, a stud in said eyes having a transverse hole, a support also having a transverse hole, an operating lever connected to one end of the band, an adjusting bolt connected to the lever, passing through the support and the stud and having a shoulder adapted to engage the support, a nut on said bolt having a collar lying in the opening between said eyes and engaging the stud, and slotted link plates between the support and the end of the band to which the lever is pivoted.

5. As an improvement in brakes, a support, a brake band adapted to engage a rotary drum, a stud carried by one end of said band, an operating lever pivotally mounted on said stud, longitudinally movable link plates connecting said stud and said support, and a longitudinally movable adjusting bolt connecting the other end of said band with said lever, the shank of said bolt being provided with a shoulder adapted to engage said support to limit said longitudinal movement.

In testimony whereof I affix my signature in presence of two witnesses.

HERBERT VANDERBEEK.

Witnesses:
 EDWIN B. KNOWLES,
 A. M. WOOSTER.